United States Patent
Tseng et al.

(10) Patent No.: US 12,470,822 B2
(45) Date of Patent: Nov. 11, 2025

(54) SHIFTABLE CIRCUIT ELEMENT, SHIFTABLE IMAGE SENSOR MODULE, CAMERA MODULE AND ELECTRONIC DEVICE

(71) Applicant: LARGAN PRECISION CO., LTD., Taichung (TW)

(72) Inventors: Te-Sheng Tseng, Taichung (TW); Lin-An Chang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 126 days.

(21) Appl. No.: 18/337,472

(22) Filed: Jun. 20, 2023

(65) Prior Publication Data

US 2024/0007748 A1 Jan. 4, 2024

Related U.S. Application Data

(60) Provisional application No. 63/357,070, filed on Jun. 30, 2022.

(30) Foreign Application Priority Data

Feb. 23, 2023 (TW) ................................ 112106819

(51) Int. Cl.
*H04N 23/68* (2023.01)
*H04N 23/54* (2023.01)
*H04N 23/57* (2023.01)

(52) U.S. Cl.
CPC .......... *H04N 23/687* (2023.01); *H04N 23/54* (2023.01); *H04N 23/57* (2023.01)

(58) Field of Classification Search
CPC ...... H04N 23/687; H04N 23/54; H04N 23/57; H04N 23/45; H04N 23/55; G03B 5/00; G03B 2205/0038; G03B 30/00
See application file for complete search history.

(56) References Cited

U.S. PATENT DOCUMENTS 7,537,462 B2 * 5/2009 Higuchi ............... G01R 1/0735
439/71
10,071,903 B2 9/2018 Liu
(Continued)

FOREIGN PATENT DOCUMENTS

CN 207571371 U 7/2018
CN 108600608 B 12/2019
(Continued)

*Primary Examiner* — Padma Haliyur
(74) *Attorney, Agent, or Firm* — McClure, Qualey & Rodack, LLP

(57) ABSTRACT

A shiftable image sensor module includes an image sensor, an inner frame portion, an outer frame portion, an elastic connecting portion and a conductive wire portion. Each of the inner frame portion and the outer frame portion has a plurality of electrical connecting terminals, and the image sensor is disposed on the inner frame portion. The outer frame portion is disposed around the inner frame portion. The elastic connecting portion is connected to the outer frame portion and the inner frame portion. The conductive wire portion is composed of a plurality of conductive wire units. Each of the conductive wire units has two ends, the ends of each of the conductive wire units are electrically connected to each of the electrical connecting terminals of the outer frame portion and the inner frame portion, respectively, and the conductive wire units of the conductive wire portion are not physically contacted.

32 Claims, 15 Drawing Sheets

(56) References Cited

U.S. PATENT DOCUMENTS

| | | | |
|---|---|---|---|
| 10,281,737 B2 | 5/2019 | Park | |
| 10,447,931 B2 | 10/2019 | Hu | |
| 10,924,675 B2 | 2/2021 | Hubert | |
| 11,936,968 B2 * | 3/2024 | Kim | H05K 1/0283 |
| 12,132,062 B2 * | 10/2024 | Baik | H10F 39/804 |
| 2006/0035486 A1 * | 2/2006 | Higuchi | H01R 12/52 |
| | | | 439/66 |
| 2016/0227117 A1 * | 8/2016 | Gutierrez | H02N 1/008 |
| 2019/0141248 A1 | 5/2019 | Hubert | |
| 2019/0208638 A1 | 7/2019 | Jung | |
| 2020/0036898 A1 | 1/2020 | Kuo | |
| 2020/0099317 A1 | 3/2020 | Wang | |
| 2021/0006693 A1 | 1/2021 | Li | |
| 2021/0409604 A1 | 12/2021 | Sharma | |
| 2022/0011537 A1 | 1/2022 | Chang | |
| 2022/0014677 A1 | 1/2022 | Smyth | |
| 2022/0102417 A1 * | 3/2022 | Park | H10F 39/811 |
| 2022/0353389 A1 * | 11/2022 | Kim | H04N 23/54 |
| 2023/0023813 A1 | 1/2023 | Oh | |
| 2023/0156911 A1 * | 5/2023 | Tanaka | H01L 23/49838 |
| | | | 348/208.11 |

FOREIGN PATENT DOCUMENTS

| | | | |
|---|---|---|---|
| CN | 111522183 A | 8/2020 | |
| CN | 113163100 A | 7/2021 | |
| WO | 2021133078 A1 | 7/2021 | |

* cited by examiner

SHIFTABLE CIRCUIT ELEMENT, SHIFTABLE IMAGE SENSOR MODULE, CAMERA MODULE AND ELECTRONIC DEVICE

RELATED APPLICATIONS

This application claims priority to U.S. Provisional Application Ser. No. 63/357,070, filed Jun. 30, 2022 and Taiwan Application Serial Number 112106819, filed Feb. 23, 2023, which are herein incorporated by references.

BACKGROUND

Technical Field

The present disclosure relates to a shiftable circuit element, a shiftable image sensor module and a camera module. More particularly, the present disclosure relates to a shiftable circuit element, a shiftable image sensor module and a camera module applicable to portable electronic devices.

Description of Related Art

In recent years, portable electronic devices have developed rapidly. For example, intelligent electronic devices and tablets have been filled in the lives of modern people, and camera modules, shiftable image sensor modules and shiftable circuit elements mounted on portable electronic devices have also prospered. However, as technology advances, the quality requirements of the shiftable circuit element are becoming higher and higher. Therefore, a shiftable circuit element, which can stably provide the electronic signal and prevent the signal short circuit, needs to be developed.

SUMMARY

According to one aspect of the present disclosure, a shiftable image sensor module includes an image sensor, an inner frame portion, an outer frame portion, an elastic connecting portion and a conductive wire portion. The inner frame portion has a plurality of electrical connecting terminals, and the image sensor is disposed on the inner frame portion. The outer frame portion is disposed around the inner frame portion, and the outer frame portion has a plurality of electrical connecting terminals. The elastic connecting portion is connected to the outer frame portion and the inner frame portion, so that the inner frame portion moves relatively to the outer frame portion. The conductive wire portion is composed of a plurality of conductive wire units. Each of the conductive wire units has two ends, the ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

According to one aspect of the present disclosure, a camera module includes the shiftable image sensor module of the aforementioned aspect, an imaging lens assembly module and an optical image stabilizing driver. The imaging lens assembly module is configured to image an imaging light on the image sensor of the shiftable image sensor module. The optical image stabilizing driver is configured to provide a driving force of the image sensor moving relatively to the imaging lens assembly module.

According to one aspect of the present disclosure, an electronic device includes the camera module of the aforementioned aspect.

According to one aspect of the present disclosure, a shiftable circuit element includes an inner frame portion, an outer frame portion, an elastic connecting portion and a conductive wire portion. The inner frame portion has a plurality of electrical connecting terminals. The outer frame portion is disposed around the inner frame portion, and the outer frame portion has a plurality of electrical connecting terminals. The elastic connecting portion is connected to the outer frame portion and the inner frame portion, so that the inner frame portion moves relatively to the outer frame portion. The conductive wire portion is composed of a plurality of conductive wire units. Each of the conductive wire units has two ends, the ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

DETAILED DESCRIPTION

Figure 1A:
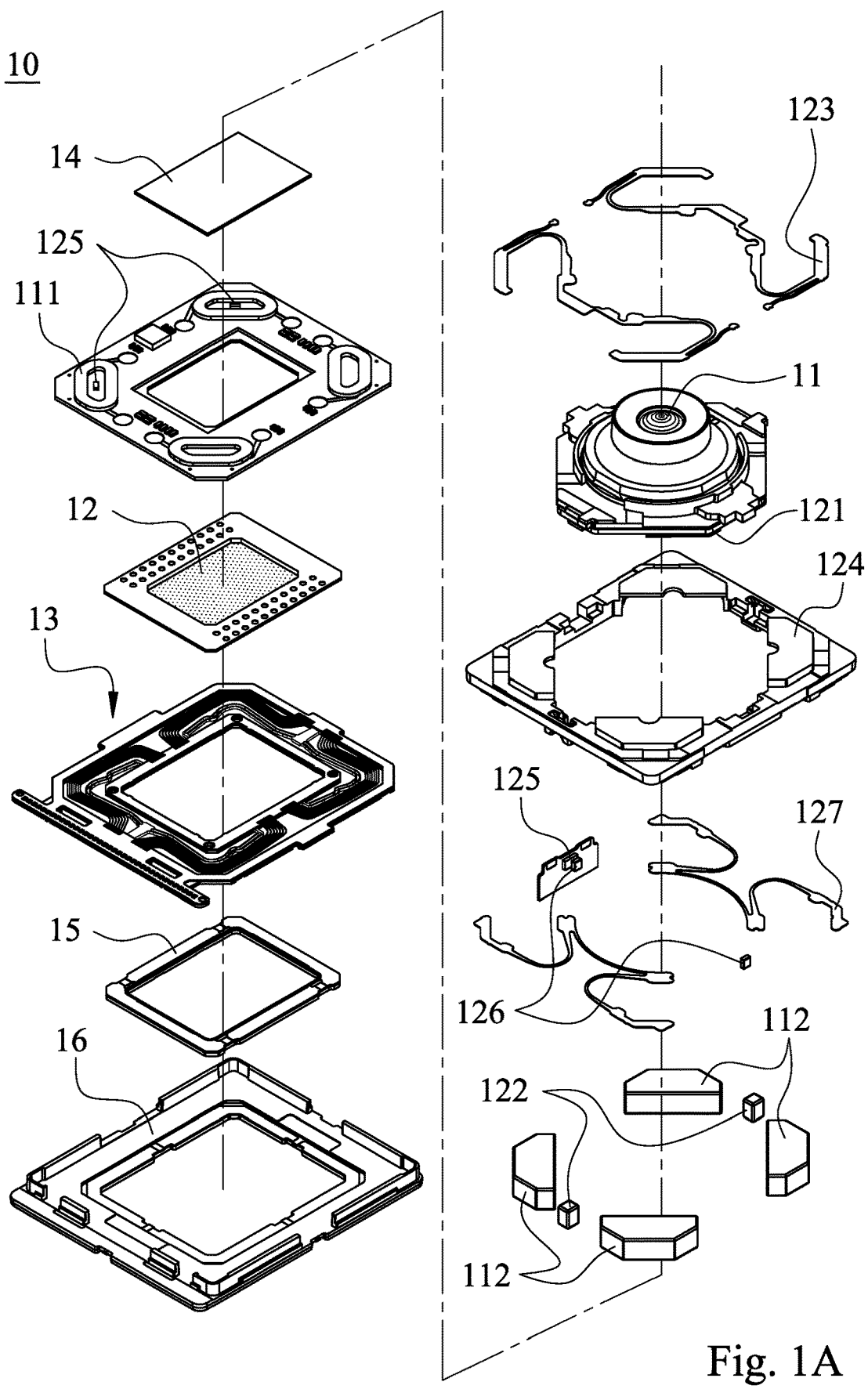
FIG. 1A is an exploded view of a camera module according to the 1st embodiment of the present disclosure.

The present disclosure provides a shiftable image sensor module, which includes an image sensor, an inner frame portion, an outer frame portion, an elastic connecting portion and a conductive wire portion. The inner frame portion has a plurality of electrical connecting terminals, and the image sensor is disposed on the inner frame portion. The outer frame portion is disposed around the inner frame portion, and the outer frame portion has a plurality of electrical connecting terminals. The elastic connecting portion is connected to the outer frame portion and the inner frame portion, so that the inner frame portion moves relatively to the outer frame portion. The conductive wire portion is composed of a plurality of conductive wire units. Each of the conductive wire units has two ends, the two ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

In particular, the electronic signal can be more stably transmitted by a plurality of independent conductive wire units, which are made of the pure conductor, according to the present disclosure connected to the inner frame portion and the outer frame portion, and the short circuit of the signal can be prevented.

Moreover, the entire of each of the conductive wire units has high conductivity, wherein the conductive wire units can be composed of copper, silver, gold, aluminum or their respective alloys, but the present disclosure is not limited thereto. The conductive wire units can be bare wires, and the electronic signal can be transmitted without the insulation material.

Both of the outer frame portion and the inner frame portion have electronic signal transmitting portions and elastic supporting portions, wherein the electronic signal transmitting portions can be welded to the conductive wire units, so that the electronic signal can be transmitted between the outer frame portion and the inner frame portion, the elastic supporting portions can be connected to the elastic connecting portion so as to provide the supporting characteristic of the outer frame portion and the inner frame portion, and the degree of freedom of the inner frame portion on a plane can be provided.

Further, the conductive wire units are directly welded to the electronic signal transmitting portion of the outer frame portion and the electronic signal transmitting portion of the inner frame portion so as to effectively simplify the difficulty of the manufacturing process for providing the feasibility of the mass production, and the entire structure can be supported by cooperating with the elastic connecting portion, so that the conductive wire portion of the elastic circuit element is not easily damaged.

The elastic connecting portion can be not physically contacted with the conductive wire portion. The mechanical interference can be prevented by the staggered disposition of the elastic connecting portion and the conductive wire portion, and the error can be prevented during the transmission of the signal.

A resilience which the inner frame portion recovers to an initial portion can be provided via the elastic connecting portion. In particular, the resilience can be provided via the elastic connecting portion after the displacement of the inner frame portion by the external driving force, so that the inner frame portion can be recovered to the initial position, wherein the initial position is the position which the inner frame portion has not moved relatively to the outer frame portion. Therefore, the mechanical supporting function can be provided via the elastic connecting portion, and the force of the inner frame portion during re-driving can be stabled.

Each of the conductive wire units can be disposed on a same plane. Therefore, the feasibility of the automated manufacturing can be provided.

All of surfaces of a periphery of each of the conductive wire units can be directly contacted with an air. Therefore, the external element is not necessary to auxiliary support the conductive wire units.

The conductive wire portion can include a copper metal material. Or, the conductive wire portion can include a copper alloy material. Therefore, the conductive wire portion can have the higher tenacity and the good electrical conductivity. Moreover, the copper alloy material can be doped with iron, zinc, tin, aluminum, nickel, titanium, cobalt, but the present disclosure is not limited thereto. When a proportion of copper content of the copper alloy material is MCu, the following condition can be satisfied: 98%<MCu<100%. By the higher proportion of copper content of the copper alloy material, the manufacturing cost can be reduced and the better electrical property can be kept. Further, the copper alloy can be composed of 99% of copper and 1% of titanium.

When at least four of the conductive wire units are adjacently disposed, and a spacing distance between adjacent two of the conductive wire units is Dc, the following condition can be satisfied: 0.05 mm≤Dc≤0.35 mm. By the aforementioned range of the spacing distance, it can be ensured that the conductive wire units are not impacted each other during the operation of the elastic circuit element. Further, the following condition can be satisfied: 0.10 mm≤Dc≤0.30 mm. Therefore, the more flexible wiring design can be obtained so as to reduce the spatial proportion of the conductive wire portion, so that the compact size of the shiftable image sensor module can be achieved.

When a width of each of the conductive wire units is Wc, the following condition can be satisfied: Wc≤0.07 mm. Therefore, the transmission of the electronic signal with the higher signal-to-noise ratio can be provided. Further, the following condition can be satisfied: Wc≤0.05 mm. Therefore, the interference of the conductive wire units during driving can be further reduced.

When the spacing distance between the adjacent two of the conductive wire units is Dc, and the width of each of the conductive wire units is Wc, the following condition can be satisfied: 2≤Dc/Wc≤7. When Dc/Wc satisfied the aforementioned condition, the stronger pulling and the greater deformation can be endured via the conductive wire units.

When a number of the conductive wire units is N, the following condition can be satisfied: 20≤N. Therefore, the higher transmitting efficiency of the image signal can be provided.

When a cross-sectional width of the elastic connecting portion is We, and a cross-sectional height of the elastic connecting portion is He, the following condition can be satisfied: 0.01≤We/He≤0.9. In particular, the greater lateral deformation can be provided via the elastic connecting portion, and the axial supporting function can be maintained. Further, the following condition can be satisfied: 0.05≤We/He≤0.6. Therefore, the reliability of the elastic connecting portion can be enhanced, and the driving stability can be enhanced.

Each of the aforementioned features of the shiftable image sensor module can be utilized in various combinations for achieving the corresponding effects.

The present disclosure provides a camera module, which includes the aforementioned shiftable image sensor module, an imaging lens assembly module and an optical image stabilizing driver. The imaging lens assembly module is configured to image an imaging light on the image sensor of the shiftable image sensor module. The optical image stabilizing driver is configured to provide a driving force of the image sensor moving relatively to the imaging lens assembly module. Furthermore, the optical image stabilizing driver can include an optical image stabilizing coil and a magnet which is corresponding thereto, and the camera module can further include an auto-focusing driver, wherein the auto-focusing driver can include an auto-focusing coil and a magnet which is corresponding thereto, and the auto-focusing driver is configured to provide a driving force for the imaging lens assembly module moving relatively to the image sensor.

The present disclosure provides an electronic device, which includes the aforementioned camera module.

The present disclosure provides a shiftable circuit element, which includes an inner frame portion, an outer frame portion, an elastic connecting portion and a conductive wire portion. The inner frame portion has a plurality of electrical connecting terminals. The outer frame portion is disposed around the inner frame portion, and the outer frame portion has a plurality of electrical connecting terminals. The elastic connecting portion is connected to the outer frame portion and the inner frame portion, so that the inner frame portion moves relatively to the outer frame portion. The conductive wire portion is composed of a plurality of conductive wire units. Each of the conductive wire units has two ends, the two ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

In particular, the electronic signal can be more stably transmitted by a plurality of independent conductive wire units, which are made of the pure conductor, according to the present disclosure connected to the inner frame portion and the outer frame portion, and the short circuit of the signal can be prevented. Further, the conductive wire units are directly welded to the electronic signal transmitting portion of the outer frame portion and the electronic signal transmitting portion of the inner frame portion so as to effectively simplify the difficulty of the manufacturing process for providing the feasibility of the mass production. The entire structure can be supported by cooperating with the elastic connecting portion, so that the conductive wire portion of the elastic circuit element is not easily damaged.

Each of the conductive wire units can be disposed on a same plane. Therefore, the feasibility of the automated manufacturing can be provided.

All of surfaces of a periphery of each of the conductive wire units can be directly contacted with an air. Therefore, the external element is not necessary to auxiliarily support the conductive wire units.

The conductive wire portion can include a copper metal material. Or, the conductive wire portion can include a copper alloy material. Therefore, the conductive wire portion can have the higher tenacity and the good electrical conductivity. In detail, when a proportion of copper content of the copper alloy material is MCu, the following condition can be satisfied: 98%<MCu<100%. By the higher proportion of copper content of the copper alloy material, the manufacturing cost can be reduced and the better electrical property can be kept.

When at least four of the conductive wire units are adjacently disposed, and a spacing distance between adjacent two of the conductive wire units is Dc, the following condition can be satisfied: 0.05 mm≤Dc≤0.35 mm. By the aforementioned range of the spacing distance, it can be ensured that the conductive wire units are not impacted each other during the operation of the elastic circuit element. Further, the following condition can be satisfied: 0.10 mm≤Dc≤0.30 mm. Therefore, the more flexible wiring design can be obtained so as to reduce the spatial proportion of the conductive wire portion, so that the compact size of the shiftable circuit element can be achieved.

When a width of each of the conductive wire units is Wc, the following condition can be satisfied: Wc≤0.07 mm. Therefore, the transmission of the electronic signal with the higher signal-to-noise ratio can be provided. Further, the following condition can be satisfied: Wc≤0.05 mm. Therefore, the interference of the conductive wire units during driving can be further reduced.

When the spacing distance between the adjacent two of the conductive wire units is Dc, and the width of each of the conductive wire units is Wc, the following condition can be satisfied: 2≤Dc/Wc≤7. When Dc/Wc satisfied the aforementioned condition, the stronger pulling and the greater deformation can be endured via the conductive wire units.

When a number of the conductive wire units is N, the following condition can be satisfied: 20≤N. Therefore, the higher transmitting efficiency of the image signal can be provided.

When a cross-sectional width of the elastic connecting portion is We, and a cross-sectional height of the elastic connecting portion is He, the following condition can be satisfied: 0.01≤We/He≤0.9. Therefore, the greater lateral deformation can be provided via the elastic connecting portion, and the axial supporting function can be maintained. Further, the following condition can be satisfied: 0.05≤We/He≤0.6. Therefore, the reliability of the elastic connecting portion can be enhanced, and the driving stability can be enhanced.

Each of the aforementioned features of the shiftable circuit element can be utilized in various combinations for achieving the corresponding effects.

According to the aforementioned embodiment, specific embodiments and examples are provided, and illustrated via figures.

1st Embodiment

FIG. 1A is an exploded view of a camera module 10 according to the 1st embodiment of the present disclosure. In FIG. 1A, the camera module 10 includes a shiftable image sensor module (its reference numeral is omitted), an imaging lens assembly module 11, an optical image stabilizing driver (its reference numeral is omitted), an auto-focusing driver (its reference numeral is omitted), a filter 14, a shiftable holder 15 and a fixed holder 16.

The shiftable image sensor module includes an image sensor 12 and a shiftable circuit element 13, wherein the image sensor 12 is disposed on the shiftable circuit element 13, but the shiftable circuit element according to the present disclosure can be corresponding to another image sensor, that is the disposition is not limited to the 1st embodiment. The imaging lens assembly module 11 is configured to image an imaging light on the image sensor 12 of the shiftable image sensor module, the optical image stabilizing driver is configured to provide a driving force of the image sensor 12 moving relatively to the imaging lens assembly module 11, and the filter 14 is disposed on an image side of the imaging lens assembly module 11 and an object side of the image sensor 12.

The optical image stabilizing driver can include an optical image stabilizing coil 111 and a plurality of fixed magnets 112, wherein the fixed magnets 112 are corresponding to the optical image stabilizing coil 111 so as to drive the image sensor 12 moving on a plane vertical to an optical axis (its reference numeral is omitted). According to the 1st embodiment, a number of the optical image stabilizing coil 111 is four, and a number of the fixed magnets 112 is four, but the present disclosure is not limited thereto.

The auto-focusing driver can include an auto-focusing coil 121, a plurality of fixed magnets 122, an upper spring leaf 123, a magnet fixer 124, a plurality of sensing elements 125, a plurality of sensing magnets 126 and a lower spring leaf 127, wherein the fixed magnets 122 are corresponding to the auto-focusing coil 121 so as to drive the imaging lens assembly module 11 moving on a direction of the optical axis and provide a driving force for the imaging lens assembly module 11 moving relatively to the image sensor 12. The upper spring leaf 123 and the lower spring leaf 127 are disposed on an object side and the image side of the imaging lens assembly module 11, respectively, and the upper spring leaf 123 is corresponding to the lower spring leaf 127. There is no relative displacement between the magnet fixer 124 and the fixed holder 16, and the fixed magnets 112, 122 can be fixed on the magnet fixer 124. The sensing elements 125 are corresponding to a portion of the optical image stabilizing coil 111 and a portion of the sensing magnets 126, wherein the sensing elements 125 are configured to sense the relative positions of the sensing magnets 126 which are corresponding. According to the 1st embodiment, a number of the fixed magnets 122 is two, a number of the sensing elements 125 is three, and a number of the sensing magnets 126 is two, but the present disclosure is not limited thereto.

Figure 1B:
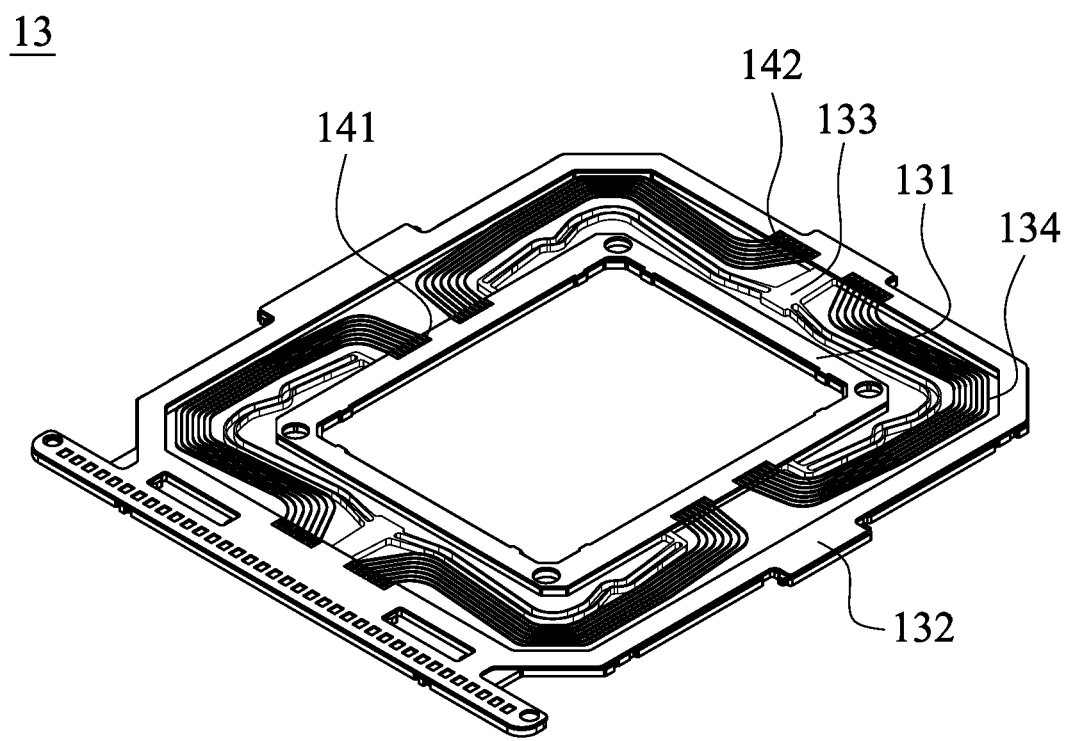
FIG. 1B is a three-dimensional view of the shiftable circuit element according to the 1st example of the 1st embodiment in FIG. 1A.
Figure 1C:
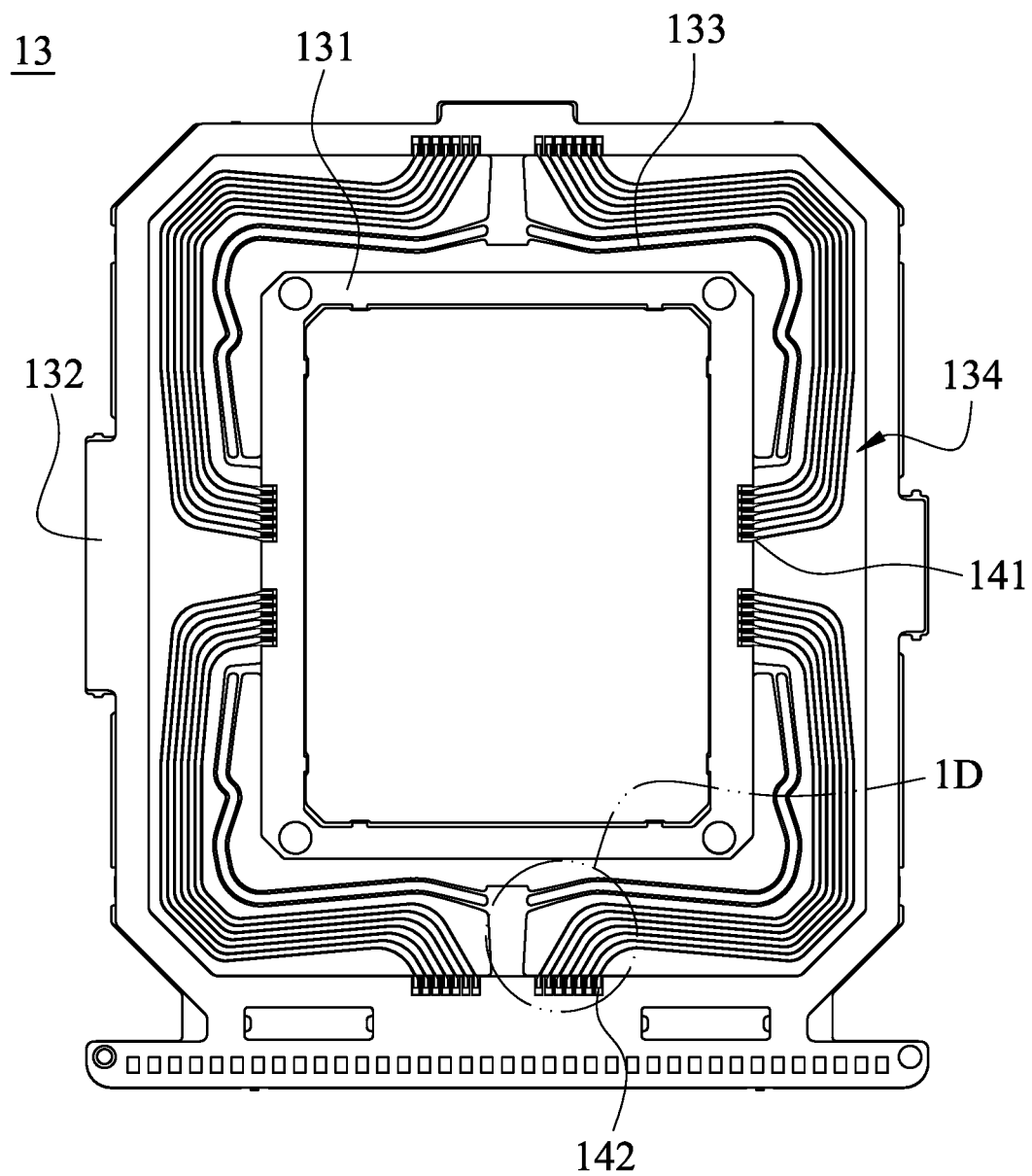
FIG. 1C is a plane schematic view of the shiftable circuit element according to the 1st example of the 1st embodiment in FIG. 1A.
Figure 1D:
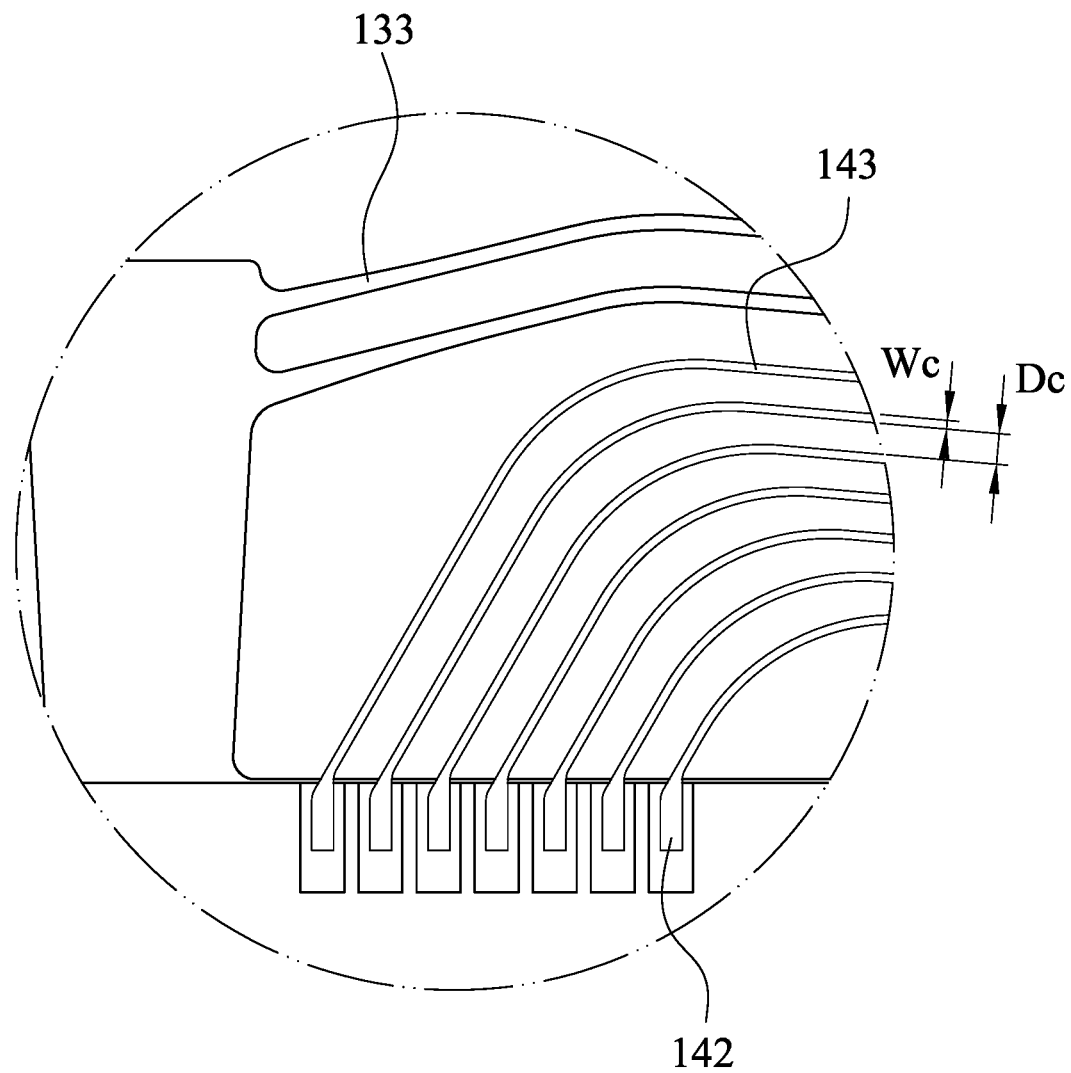
FIG. 1D is a partial enlarged view of the shiftable circuit element according to the 1st example of the 1st embodiment in FIG. 1C.

FIG. 1B is a three-dimensional view of the shiftable circuit element 13 according to the 1st example of the 1st embodiment in FIG. 1A. FIG. 1C is a plane schematic view of the shiftable circuit element 13 according to the 1st example of the 1st embodiment in FIG. 1A. FIG. 1D is a partial enlarged view of the shiftable circuit element 13 according to the 1st example of the 1st embodiment in FIG. 1C. In FIGS. 1A to 1D, the shiftable circuit element 13 includes an inner frame portion 131, an outer frame portion 132, an elastic connecting portion 133 and a conductive wire portion 134. The inner frame portion 131 has a plurality of electrical connecting terminals 141, the image sensor 12 is disposed on the inner frame portion 131, and the shiftable holder 15 is fixed on the inner frame portion 131. The outer frame portion 132 is disposed around the inner frame portion 131, the outer frame portion 132 has a plurality of electrical connecting terminals 142, and the fixed holder 16 is fixed on the outer frame portion 132. The elastic connecting portion 133 is connected to the outer frame portion 132 and the inner frame portion 131, so that the inner frame portion 131 moves relatively to the outer frame portion 132. The conductive wire portion 134 is composed of a plurality of conductive wire units 143, each of the conductive wire units 143 has two ends, one of the two ends of each of the conductive wire units 143 is electrically connected to each of the electrical connecting terminals 142 of the outer frame portion 132, the other one of the two ends of each of the conductive wire units 143 is electrically connected to each of the electrical connecting terminals 141 of the inner frame portion 131, the conductive wire units 143 of the conductive wire portion 134 are not physically contacted, and an entire of each of the conductive wire units 143 is a conductor material.

Figure 1E:
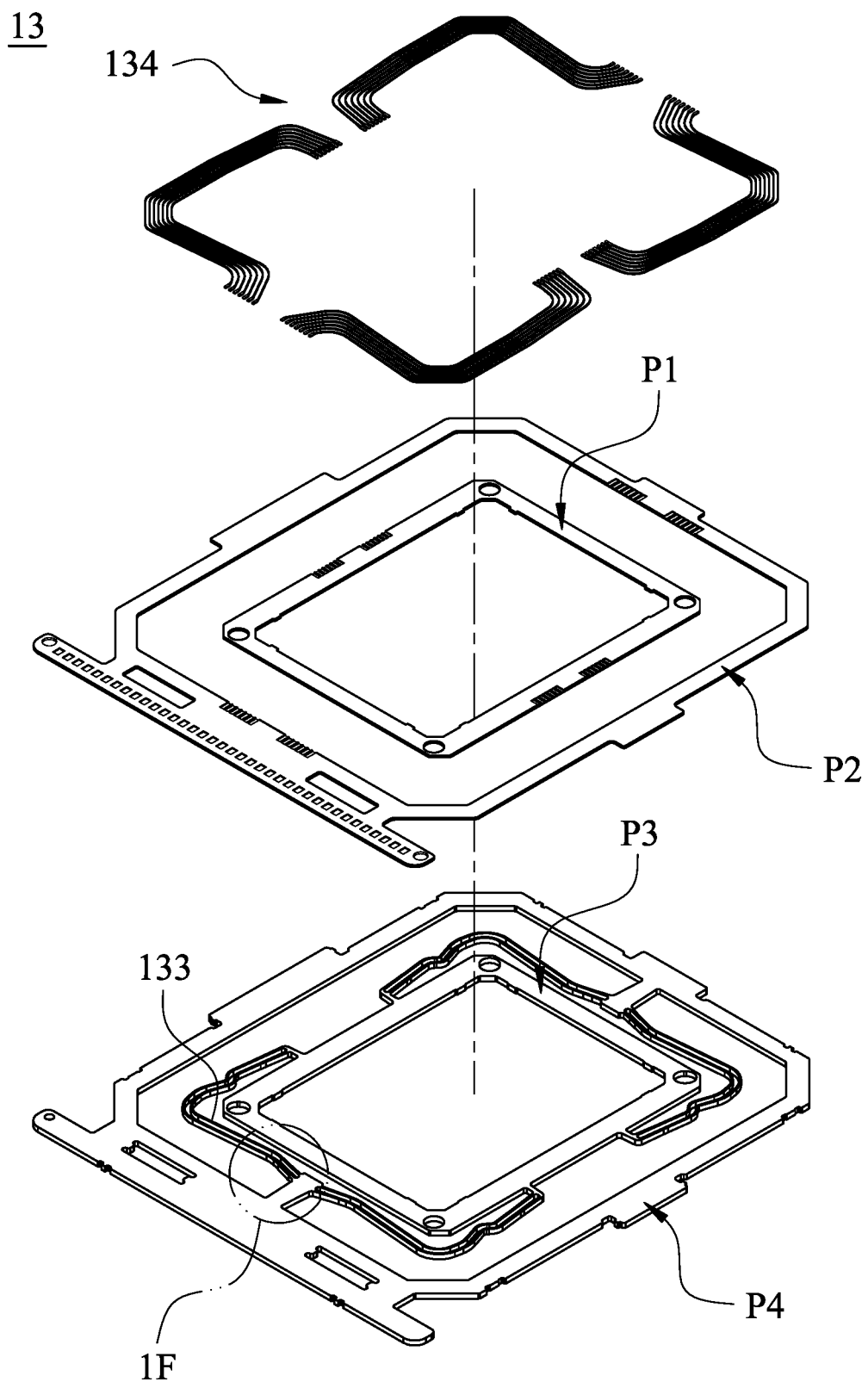
FIG. 1E is an exploded view of the shiftable circuit element according to the 1st example of the 1st embodiment in FIG. 1A.
Figure 1F:
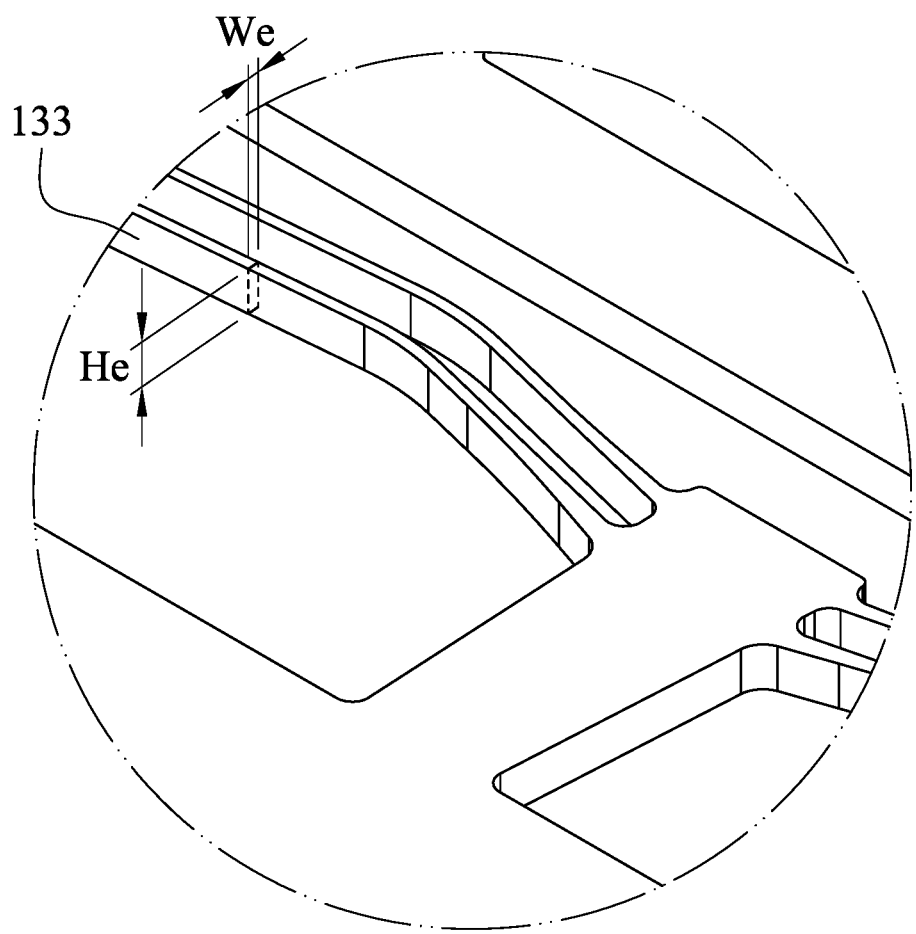
FIG. 1F is a partial enlarged view of the shiftable circuit element according to the 1st example of the 1st embodiment in FIG. 1E.

FIG. 1E is an exploded view of the shiftable circuit element 13 according to the 1st example of the 1st embodiment in FIG. 1A. FIG. 1F is a partial enlarged view of the shiftable circuit element 13 according to the 1st example of the 1st embodiment in FIG. 1E. In FIGS. 1B to 1F, the electronic signal can be more stably transmitted by a plurality of independent conductive wire units 143, which are made of the pure conductor, connected to the inner frame portion 131 and the outer frame portion 132, and the short circuit of the signal can be prevented.

Moreover, the entire of each of the conductive wire units 143 has high conductivity, wherein the conductive wire units 143 can be composed of copper, silver, gold, aluminum or their respective alloys, but the present disclosure is not limited thereto. Further, the conductive wire units 143 can be bare wires, and the electronic signal can be transmitted without the insulation material.

In FIG. 1E, the inner frame portion 131 has an electronic signal transmitting portion P1 and an elastic supporting portion P3, and the outer frame portion 132 has an electronic signal transmitting portion P2 and an elastic supporting portion P4, wherein the electronic signal transmitting portions P1, P2 can be welded to the conductive wire units 143, so that the electronic signal can be transmitted between the outer frame portion 132 and the inner frame portion 131, the elastic supporting portions P3, P4 can be connected to the elastic connecting portion 133 so as to provide the supporting characteristic of the outer frame portion 132 and the inner frame portion 131, and the degree of freedom of the inner frame portion 131 on a plane can be provided.

Further, the conductive wire units 143 are directly welded to the electronic signal transmitting portion P1 of the inner frame portion 131 and the electronic signal transmitting portion P2 of the outer frame portion 132 so as to effectively simplify the difficulty of the manufacturing process for providing the feasibility of the mass production, and the entire structure can be supported by cooperating with the elastic connecting portion 133, so that the conductive wire portion 134 is not easily damaged.

Moreover, the electronic signal transmitting portions P1, P2 can be configured to transmit the electronic signal of the image sensor 12, the electronic signal of the optical image stabilizing coil 111 and the electronic signal of the sensing elements 125.

In FIG. 1C, the elastic connecting portion 133 is not physically contacted with the conductive wire portion 134, and a resilience which the inner frame portion 131 recovers to an initial portion can be provided via the elastic connecting portion 133. The mechanical interference can be prevented by the staggered disposition of the elastic connecting portion 133 and the conductive wire portion 134, and the error can be prevented during the transmission of the signal. Moreover, the resilience can be provided via the elastic connecting portion 133 after the displacement of the inner frame portion 131 by the external driving force, so that the inner frame portion 131 can be recovered to the initial position. Therefore, the mechanical supporting function can be provided via the elastic connecting portion 133, and the force of the inner frame portion 131 during re-driving can be stabled.

Each of the conductive wire units 143 is disposed on a same plane so as to provide the feasibility of the automated manufacturing, and all of surfaces of a periphery of each of the conductive wire units 143 can be directly contacted with an air. Therefore, the external element is not necessary to auxiliarily support the conductive wire units 143.

The conductive wire portion 134 can include a copper metal material, so that the conductive wire portion 134 can have the higher tenacity and the good electrical conductivity. Or, the conductive wire portion 134 can include a copper alloy material, so that the conductive wire portion 134 can have the higher tenacity and the good electrical conductivity, wherein the copper alloy material can be doped with iron, zinc, tin, aluminum, nickel, titanium, cobalt, but the present disclosure is not limited thereto. In detail, when a proportion of copper content of the copper alloy material is MCu, the following condition can be satisfied: 98%<MCu<100%. By the higher proportion of copper content of the copper alloy material, the manufacturing cost can be reduced and the better electrical property can be kept, and the copper alloy can be composed of 99% of copper and 1% of titanium.

In FIGS. 1D and 1F, at least four of the conductive wire units 143 are adjacently disposed, and a spacing distance between adjacent two of the conductive wire units 143 is Dc; a width of each of the conductive wire units 143 is Wc; a number of the conductive wire units 143 is N; a cross-sectional width of the elastic connecting portion 133 is We; a cross-sectional height of the elastic connecting portion 133 is He, the following conditions of Table 1A are satisfied.

TABLE 1A the 1st example of the 1st embodiment

| Dc (mm) | 0.14 | We (mm) | 0.07 |
|---|---|---|---|
| Wc (mm) | 0.04 | He (mm) | 0.25 |
| Dc/Wc | 3.5 | We/He | 0.28 |
| N | 28 | | |

According to the 2nd example of the 1st embodiment, at least four of the conductive wire units 143 are adjacently disposed, and a spacing distance between adjacent two of the conductive wire units 143 is Dc; a width of each of the conductive wire units 143 is Wc; a number of the conductive wire units 143 is N; a cross-sectional width of the elastic connecting portion 133 is We; a cross-sectional height of the elastic connecting portion 133 is He, wherein the spacing distance Dc between the adjacent two of the conductive wire units 143, the width Wc of each of the conductive wire units 143, the cross-sectional width We of the elastic connecting portion 133 and the cross-sectional height He of the elastic connecting portion 133 can be referred to the indications in FIGS. 1D and 1F, and the following conditions of Table 1 B are satisfied.

TABLE 1B the 2nd example of the 1st embodiment

| Dc (mm) | 0.18 | We (mm) | 0.05 |
|---|---|---|---|
| Wc (mm) | 0.03 | He (mm) | 0.30 |
| Dc/Wc | 6.0 | We/He | 0.167 |
| N | 36 | | |

According to the 3rd example of the 1st embodiment, at east four of the conductive wire units 143 are adjacently disposed, and a spacing distance between adjacent two of the conductive wire units 143 is Dc; a width of each of the conductive wire units 143 is Wc; a number of the conductive wire units 143 is N; a cross-sectional width of the elastic connecting portion 133 is We; a cross-sectional height of the elastic connecting portion 133 is He, wherein the spacing distance Dc between the adjacent two of the conductive wire units 143, the width Wc of each of the conductive wire units 143, the cross-sectional width We of the elastic connecting portion 133 and the cross-sectional height He of the elastic connecting portion 133 can be referred to the indications in FIGS. 1D and 1F, and the following conditions of Table 1C are satisfied.

TABLE 1C the 3rd example of the 1st embodiment

| Dc (mm) | 0.10 | We (mm) | 0.08 |
|---|---|---|---|
| Wc (mm) | 0.04 | He (mm) | 0.20 |
| Dc/Wc | 2.5 | We/He | 0.40 |
| N | 32 | | |

2nd Embodiment

Figure 2A:
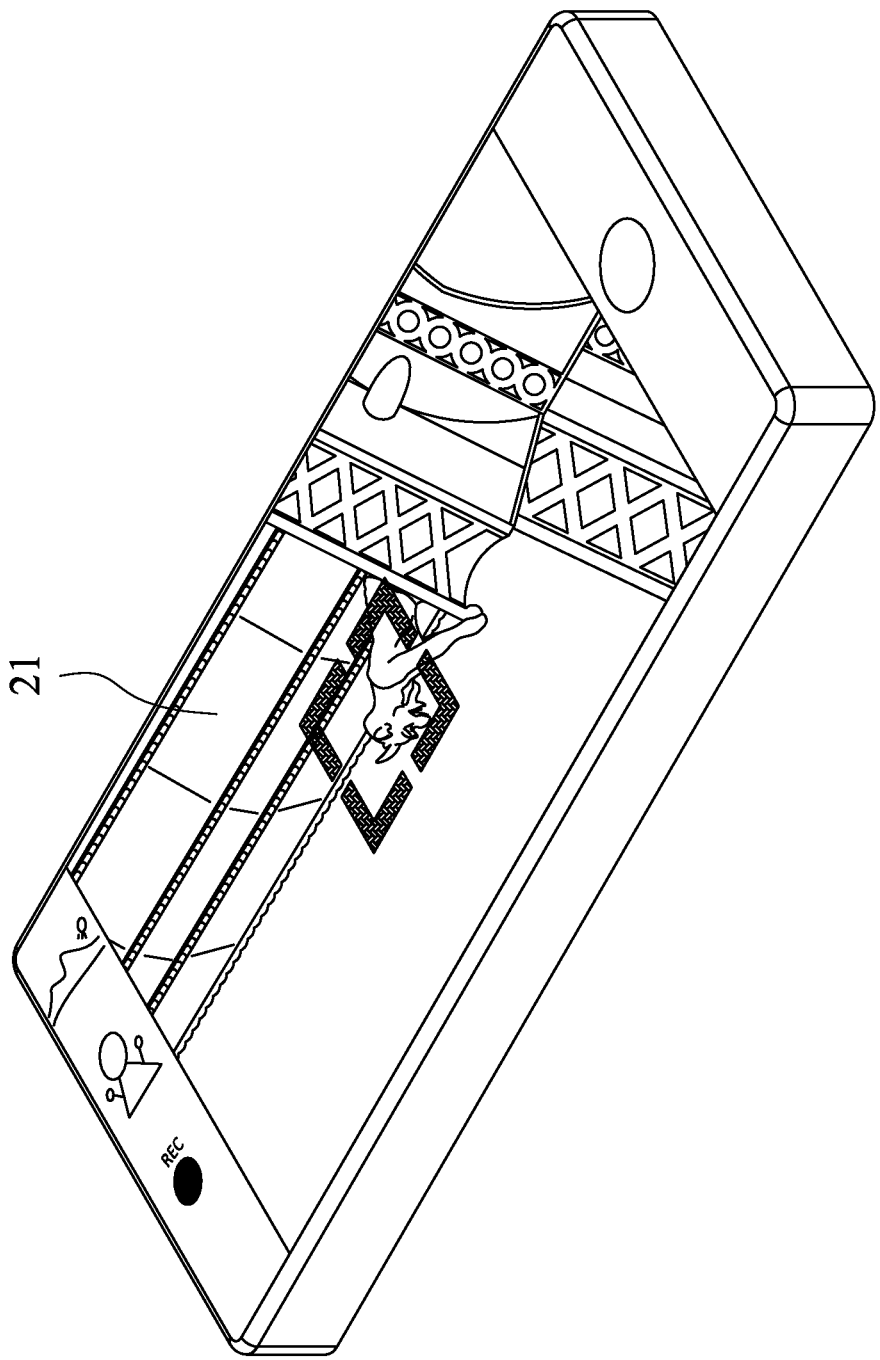
FIG. 2A is a schematic view of an electronic device according to the 2nd embodiment of the present disclosure.
Figure 2B:
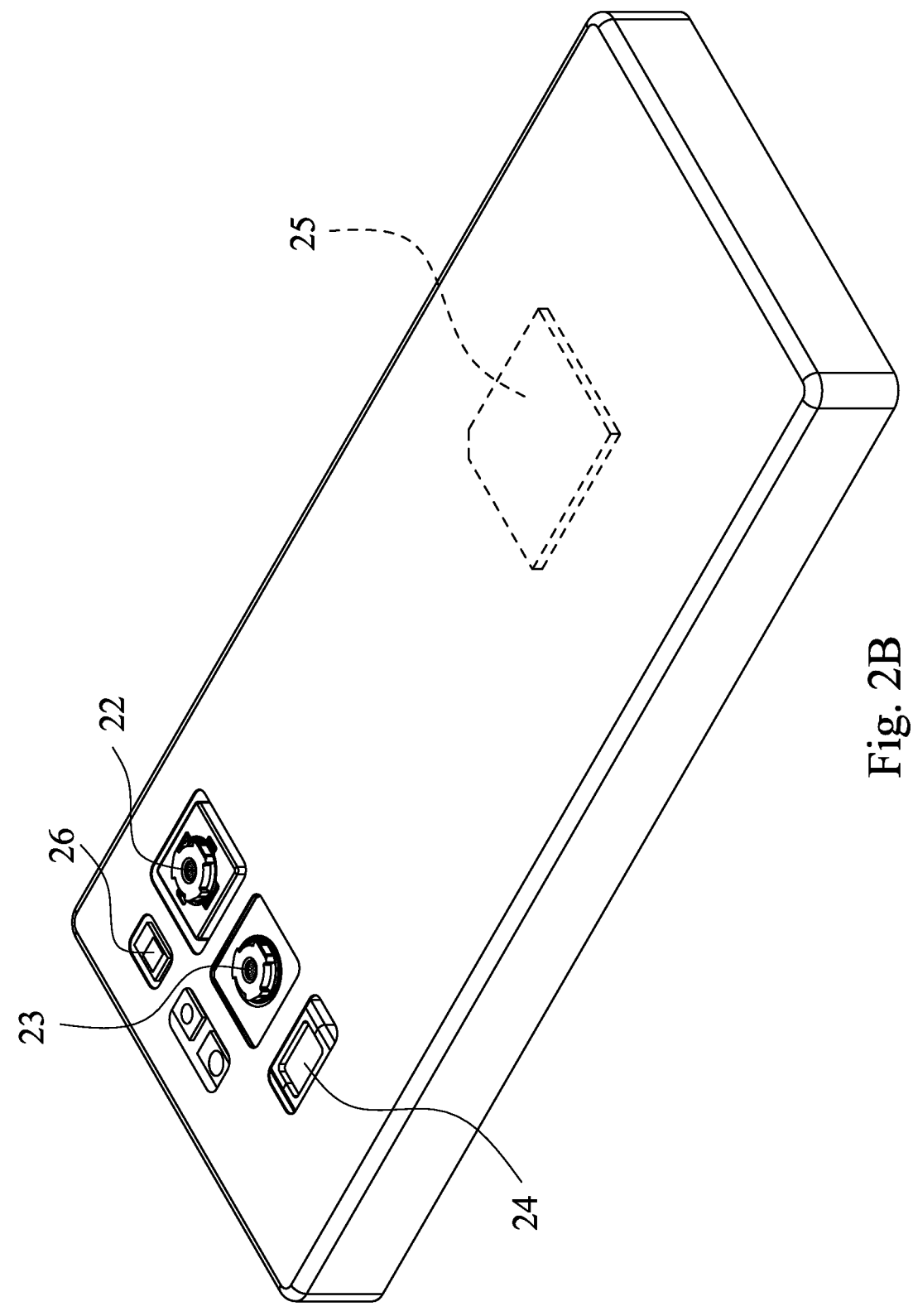
FIG. 2B is another schematic view of the electronic device according to the 2nd embodiment in FIG. 2A.

FIG. 2A is a schematic view of an electronic device 20 according to the 2nd embodiment of the present disclosure. FIG. 2B is another schematic view of the electronic device 20 according to the 2nd embodiment in FIG. 2A. In FIGS. 2A and 2B, the electronic device 20 is a smart phone, which includes a camera module and a user interface 21. Moreover, the camera module can be an ultra-wide angle camera module 22, a high resolution camera module 23 and a telephoto camera module 24, and the user interface 21 is a touch screen, but the present disclosure is not limited thereto. In particular, the camera module can be the camera module according to the aforementioned 1st embodiment, but the present disclosure is not limited thereto.

Users enter a shooting mode via the user interface 21, wherein the user interface 21 is configured to display the scene, and the shooting angle can be manually adjusted to switch the ultra-wide angle camera module 22, the high resolution camera module 23 and the telephoto camera module 24. At this moment, the imaging light is gathered on an image sensor (not shown) via the camera module, and an electronic signal about an image is output to an image signal processor (ISP) 25.

In FIG. 2B, to meet a specification of the electronic device 20, the electronic device 20 can further include an optical anti-shake mechanism (not shown). Furthermore, the electronic device 20 can further include at least one focusing assisting module (its reference numeral is omitted) and at least one sensing element (not shown). The focusing assisting module can be a flash module 26 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 20 equipped with an auto-focusing mechanism and the optical anti-shake mechanism can be enhanced to achieve the superior image quality. Furthermore, the electronic device 20 according to the present disclosure can have a capturing function with multiple modes, such as taking optimized selfies, high dynamic range (HDR) under a low light condition, 4K resolution recording and so on. Furthermore, the users can visually see a captured image of the camera through the user interface 21 and manually operate the view finding range on the user interface 21 to achieve the autofocus function of what you see is what you get.

Moreover, the camera module, the optical anti-shake mechanism, the sensing element and the focusing assisting module can be disposed on a flexible printed circuit board (FPC) (not shown) and electrically connected to the associated components, such as the image signal processor 25, via a connector (not shown) to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. According to the 2nd embodiment, the electronic device 20 can include a plurality of sensing elements and a plurality of focusing assisting modules. The sensing elements and the focusing assisting modules are disposed on the flexible printed circuit board and at least one other flexible printed circuit board (not shown) and electrically connected to the associated components, such as the image signal processor 25, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 20 can further include, but not be limited to, a display, a control unit, a storage unit, a random access memory (RAM), a read-only memory (ROM), or the combination thereof.

Figure 2C:
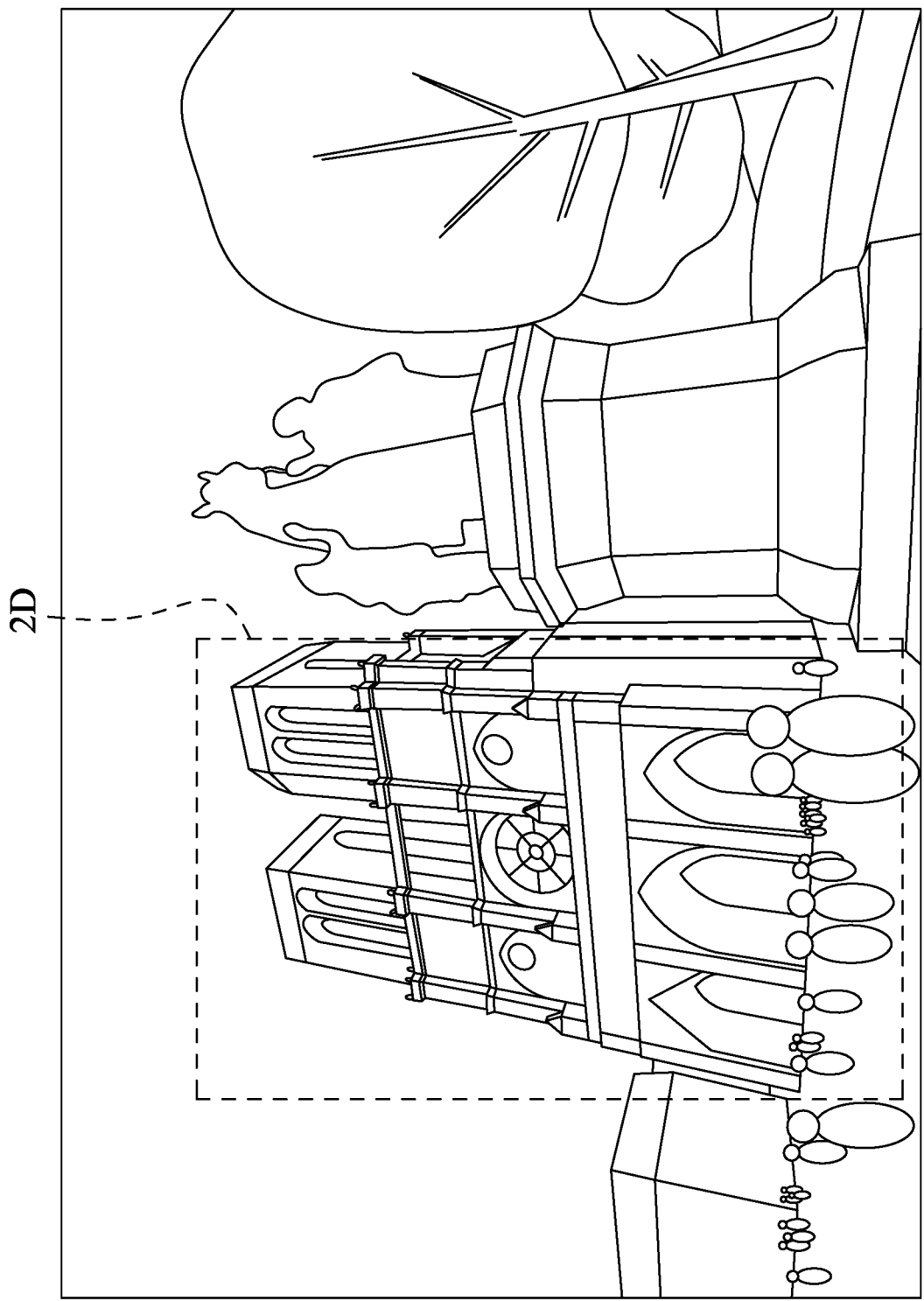
FIG. 2C is a schematic view of an image captured via the electronic device according to the 2nd embodiment in FIG. 2A.

FIG. 2C is a schematic view of an image captured via the electronic device 20 according to the 2nd embodiment in FIG. 2A. In FIG. 2C, the larger range of the image can be captured via the ultra-wide angle camera module 22, and the ultra-wide angle camera module 22 has the function of accommodating wider range of the scene.

Figure 2D:
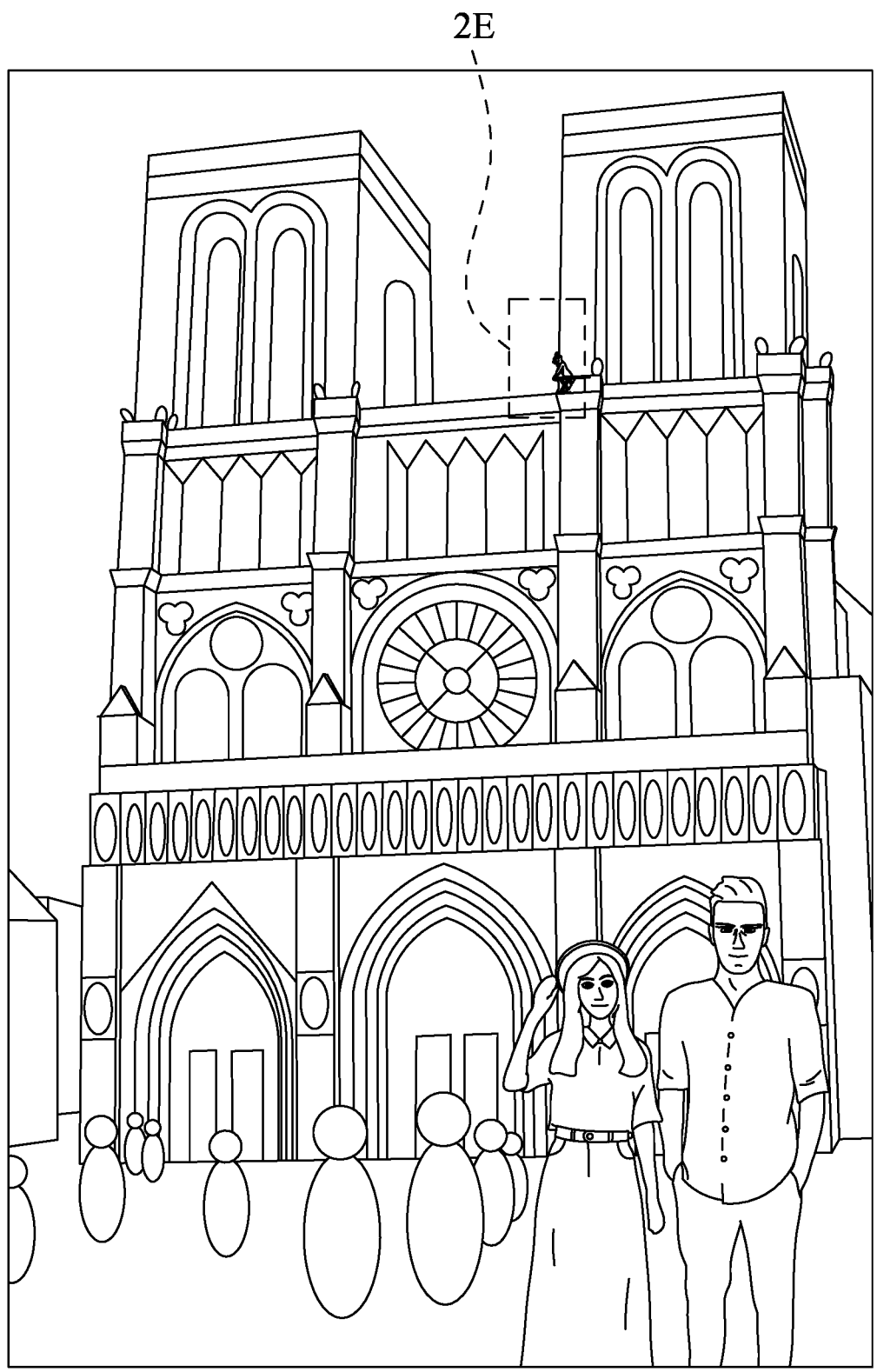
FIG. 2D is another schematic view of an image captured via the electronic device according to the 2nd embodiment in FIG. 2A.

FIG. 2D is another schematic view of an image captured via the electronic device 20 according to the 2nd embodiment in FIG. 2A. In FIG. 2D, the image of the certain range with the high resolution can be captured via the high resolution camera module 23, and the high resolution camera module 23 has the function of the high resolution and the low deformation.

Figure 2E:
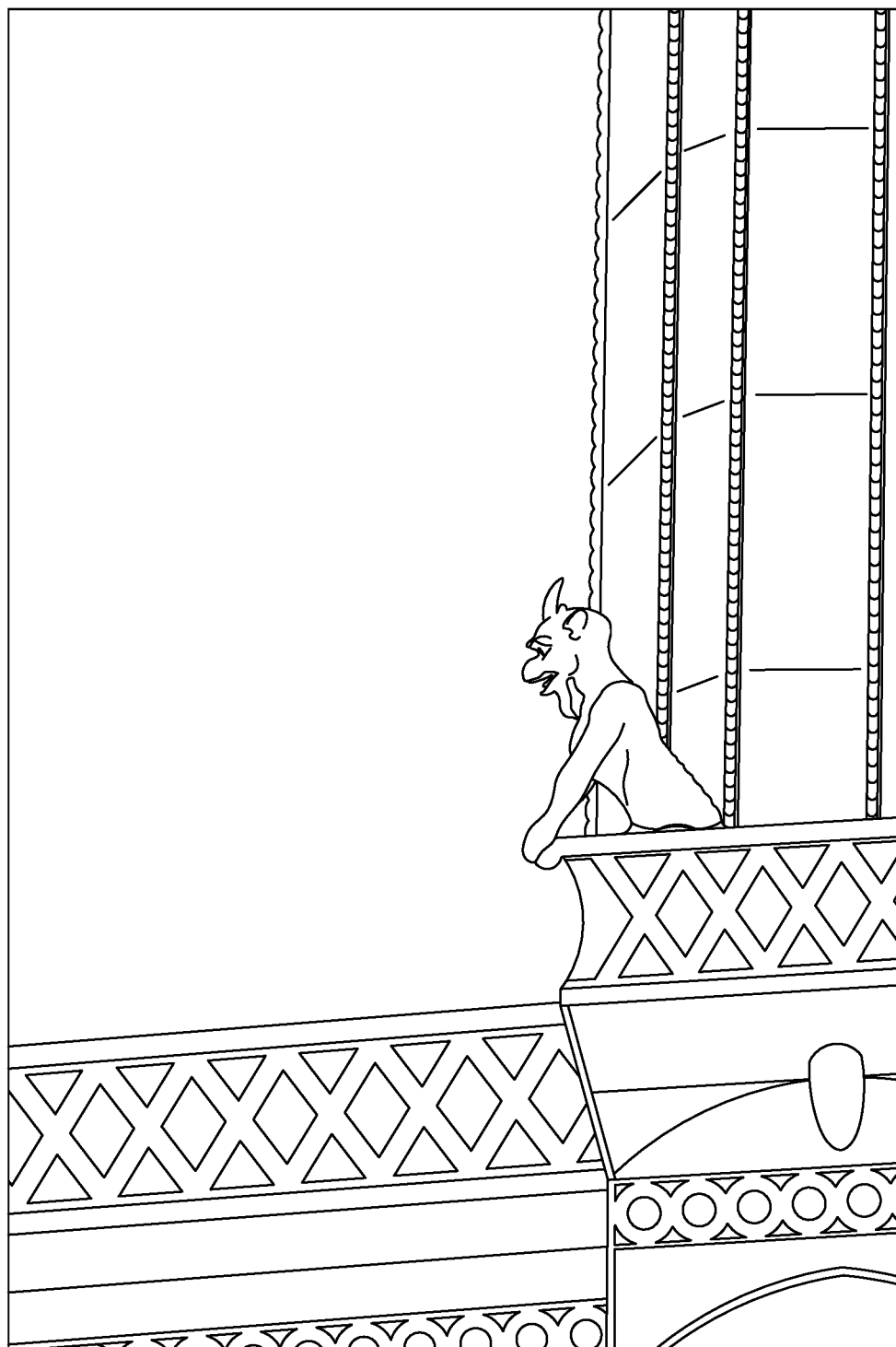
FIG. 2E is another schematic view of an image captured via the electronic device according to the 2nd embodiment in FIG. 2A.

FIG. 2E is another schematic view of an image captured via the electronic device 20 according to the 2nd embodiment in FIG. 2A. In FIG. 2E, the telephoto camera module 24 has the enlarging function of the high magnification, and the distant image can be captured and enlarged with high magnification via the telephoto camera module 24.

In FIGS. 2C to 2E, the zooming function can be obtained via the electronic device 20, when the scene is captured via the camera module with different focal lengths cooperated with the function of image processing.

3rd Embodiment

Figure 3:
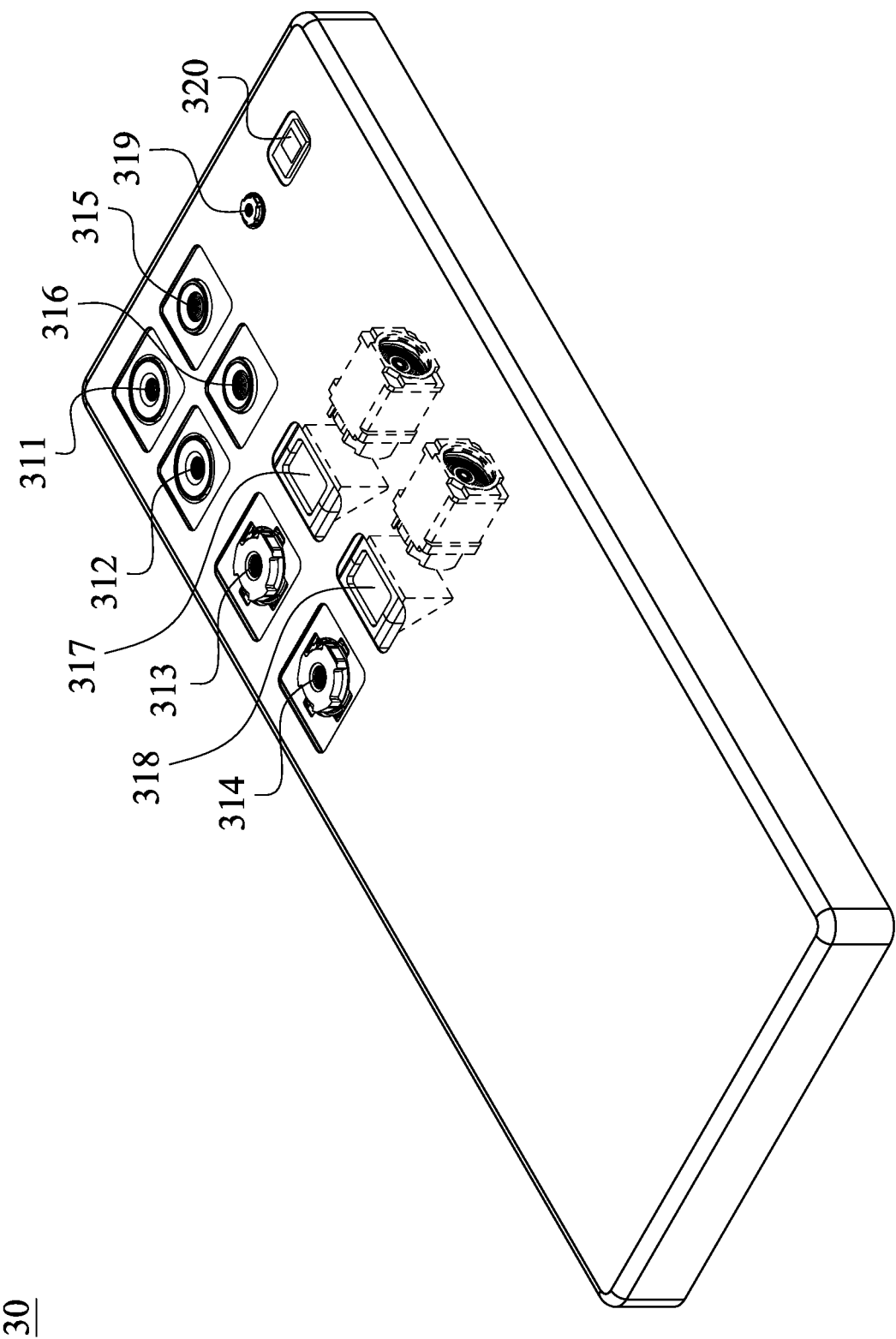
FIG. 3 is a schematic view of an electronic device according to the 3rd embodiment of the present disclosure.

FIG. 3 is a schematic view of an electronic device 30 according to the 3rd embodiment of the present disclosure. In FIG. 3, the electronic device 30 is a smart phone, which includes a camera module. Moreover, the camera module can be ultra-wide angle camera modules 311, 312, wide angle camera modules 313, 314, telephoto camera modules 315, 316, 317, 318 and a Time-Of-Flight (TOF) module 319. The TOF module 319 can be another type of the camera module, and the disposition is not limited thereto. In particular, the camera module can be the camera module according to the aforementioned 1st embodiment, but the present disclosure is not limited thereto.

Further, the telephoto camera modules 317, 318 are configured to fold the light, but the present disclosure is not limited thereto.

To meet a specification of the camera module of the electronic device 30, the electronic device 30 can further include an optical anti-shake mechanism (not shown). Furthermore, the electronic device 30 can further include at least one focusing assisting module (not shown) and at least one sensing element (not shown). The focusing assisting module can be a flash module 320 for compensating a color temperature, an infrared distance measurement component, a laser focus module and so on. The sensing element can have functions for sensing physical momentum and kinetic energy, such as an accelerator, a gyroscope, a Hall Effect Element, to sense shaking or jitters applied by hands of the users or external environments. Accordingly, the camera module of the electronic device 30 equipped with an auto-focusing mechanism and the optical anti-shake mechanism can be enhanced to achieve the superior image quality. Furthermore, the electronic device 30 according to the present disclosure can have a capturing function with multiple modes, such as taking optimized selfies, High Dynamic Range (HDR) under a low light condition, 4K Resolution recording and so on.

Further, all of other structures and dispositions according to the 3rd embodiment are the same as the structures and the dispositions according to the 2nd embodiment, and will not be described again herein.

4th Embodiment

Figure 4A:
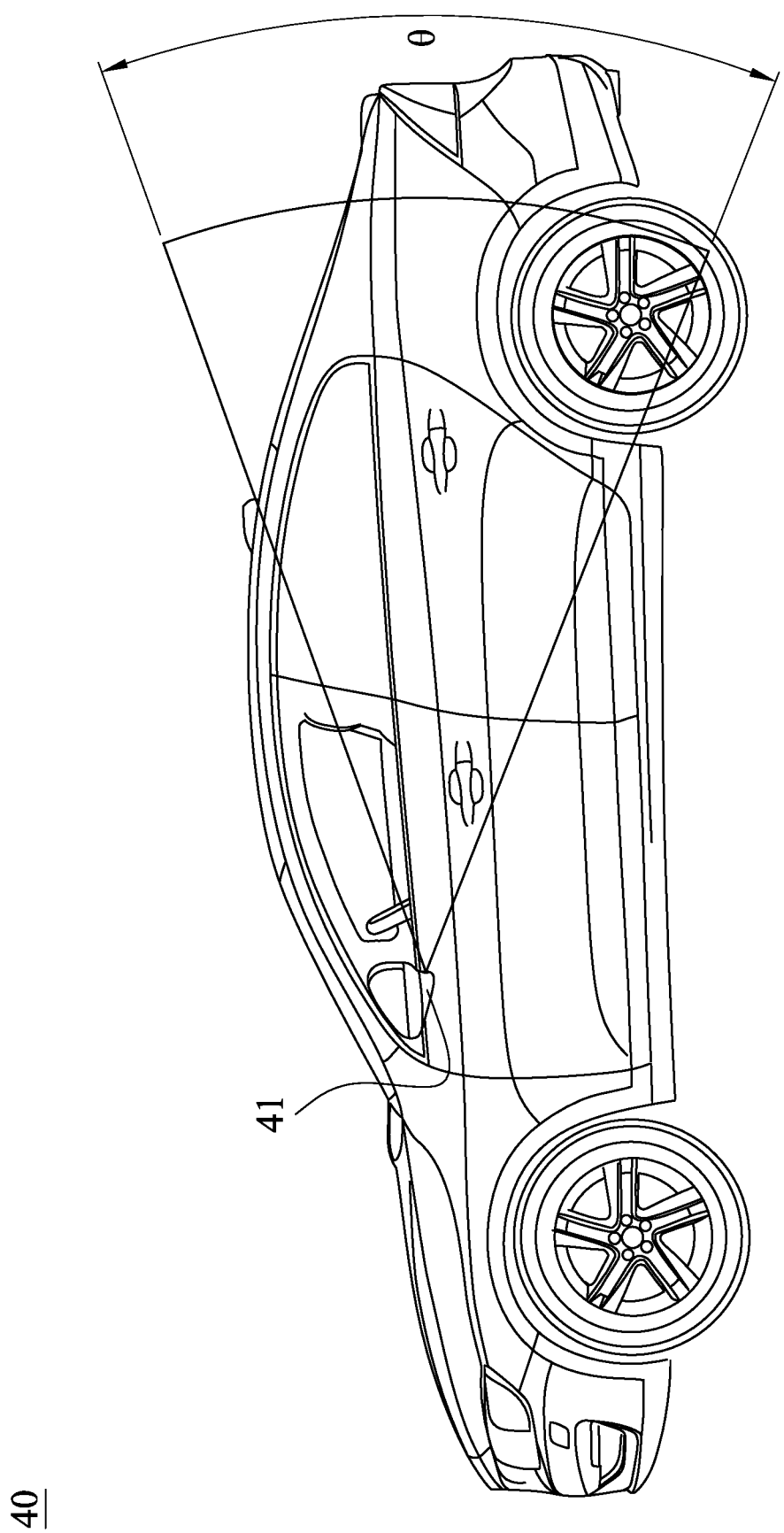
FIG. 4A is a schematic view of a vehicle instrument according to the 4th embodiment of the present disclosure.
Figure 4B:
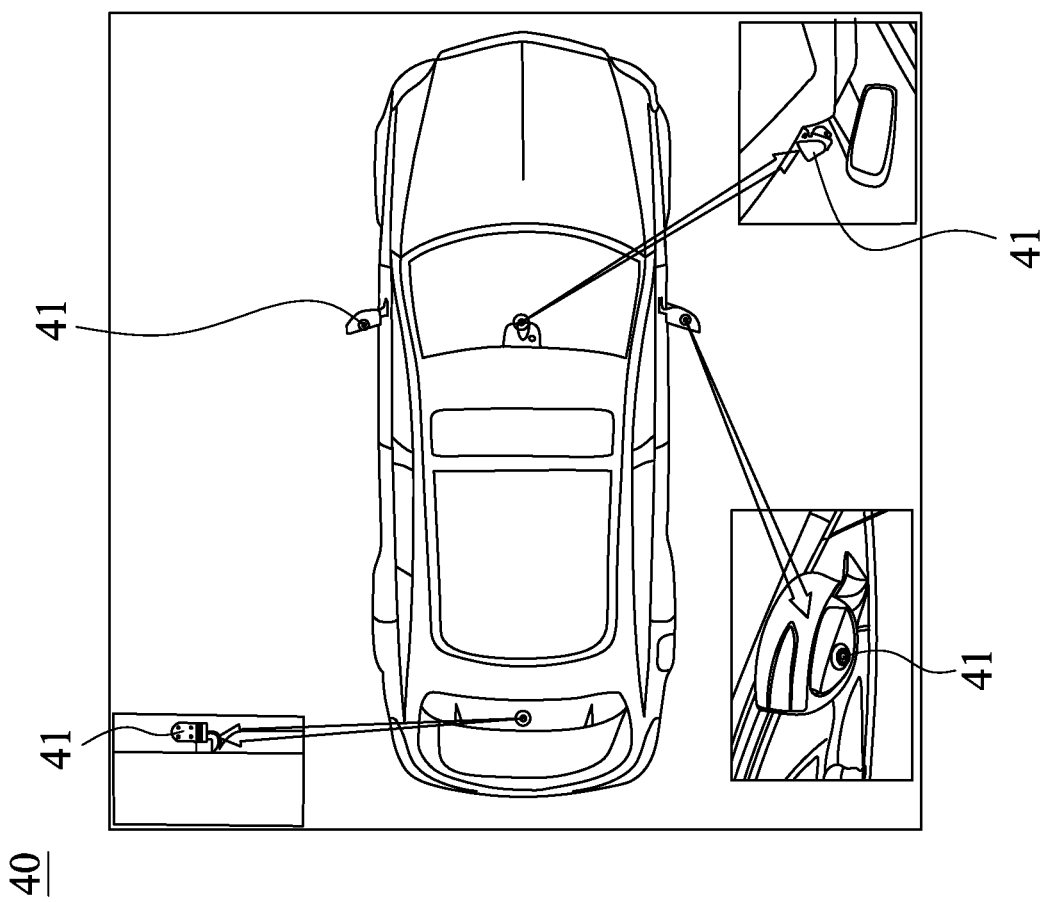
FIG. 4B is another schematic view of the vehicle instrument according to the 4th embodiment in FIG. 4A.
Figure 4C:
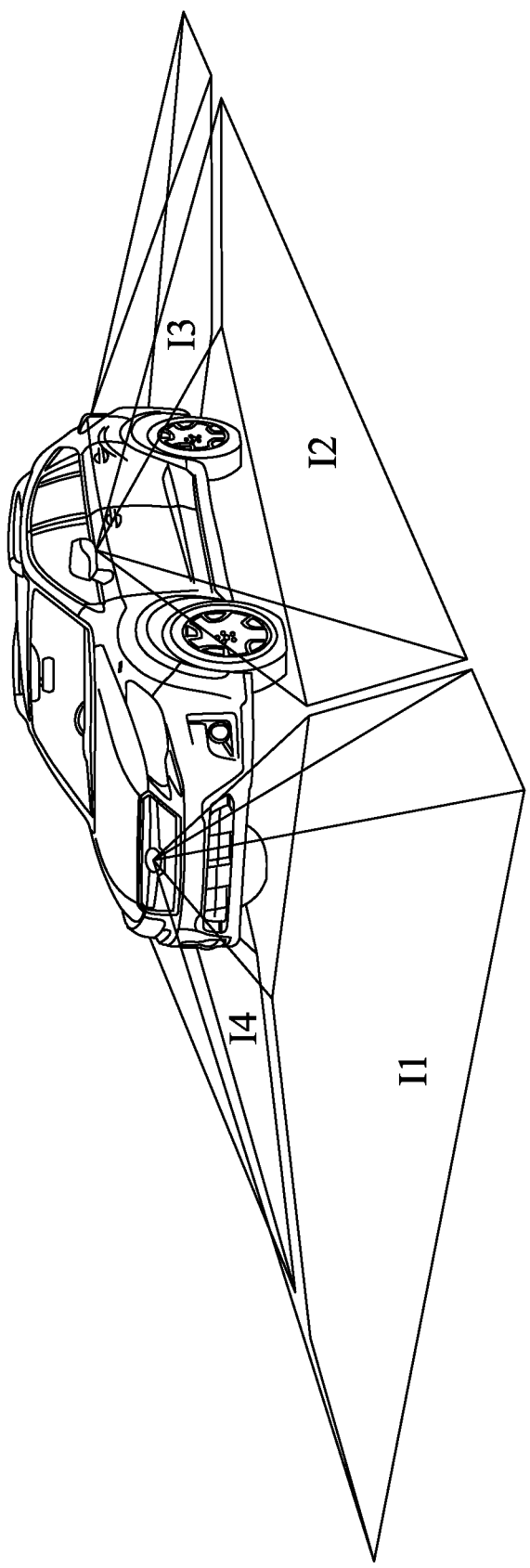
FIG. 4C is another schematic view of the vehicle instrument according to the 4th embodiment in FIG. 4A.

FIG. 4A is a schematic view of a vehicle instrument 40 according to the 4th embodiment of the present disclosure. FIG. 4B is another schematic view of the vehicle instrument 40 according to the 4th embodiment in FIG. 4A. FIG. 4C is another schematic view of the vehicle instrument 40 according to the 4th embodiment in FIG. 4A. In FIGS. 4A to 4C, the vehicle instrument 40 includes a plurality of camera modules 41. According to the 4th embodiment, a number of the camera modules 41 is six, and the camera modules 41 can be the camera module according to the aforementioned 1st embodiment, but the present disclosure is not limited thereto.

In FIGS. 4A and 4B, the camera modules 41 are automotive camera modules, two of the camera modules 41 are located under rearview mirrors on a left side and a right side, respectively, and the aforementioned camera modules 41 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 4B, another two of the camera modules 41 can be disposed in the inner space of the vehicle instrument 40. In particular, the aforementioned two camera modules 41 are disposed on a location close to the rearview mirror inside the vehicle instrument 40 and a location close to the rear car window, respectively. Moreover, the camera modules 41 can be further disposed on the rearview mirrors of the vehicle instrument 40 on the left side and the right side except the mirror surface, respectively, but the present disclosure is not limited thereto.

In FIG. 4C, another two of the camera modules 41 can be disposed on a front end of the vehicle instrument 40 and a rear end of the vehicle instrument 40, respectively. By disposing the camera modules 41 on the front end and the rear end of the vehicle instrument 40 and under the rearview mirror on the left side of the vehicle instrument 40 and the right side of the vehicle instrument 40, it is favorable for the drivers obtaining the external space information in addition to the driving seat, such as the external space informations 11, 12, 13, 14, but the present disclosure is not limited thereto. Therefore, more visual angles can be provided to reduce the blind spot, so that the driving safety can be improved. Further, the traffic information outside of the vehicle instrument 40 can be recognized by disposing the camera modules 41 on the periphery of the vehicle instrument 40, so that the function of the automatic driving assistance can be achieved.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A shiftable image sensor module, comprising:
   an image sensor;
   an inner frame portion having a plurality of electrical connecting terminals, and the image sensor disposed on the inner frame portion;
   an outer frame portion disposed around the inner frame portion, and the outer frame portion having a plurality of electrical connecting terminals;
   an elastic connecting portion physically connected to the outer frame portion and the inner frame portion, and the elastic connecting portion is configured to support the inner frame portion, so that the inner frame portion moving relatively to the outer frame portion; and
   a conductive wire portion composed of a plurality of conductive wire units;
   wherein each of the conductive wire units has two ends, the two ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

2. The shiftable image sensor module of claim 1, wherein the elastic connecting portion is not physically contacted with the conductive wire portion.

3. The shiftable image sensor module of claim 1, wherein a resilience which the inner frame portion recovers to an initial portion is provided via the elastic connecting portion.

4. The shiftable image sensor module of claim 1, wherein at least four of the conductive wire units are adjacently disposed, a spacing distance between adjacent two of the at least four conductive wire units is Dc, and the following condition is satisfied:

$$0.05 \text{ mm} \leq Dc \leq 0.35 \text{ mm}.$$

5. The shiftable image sensor module of claim 4, wherein the spacing distance between the adjacent two of the at least four conductive wire units is Dc, and the following condition is satisfied:

$$0.10 \text{ mm} \leq Dc \leq 0.30 \text{ mm}.$$

6. The shiftable image sensor module of claim 1, wherein a width of each of the conductive wire units is Wc, and the following condition is satisfied:

$$Wc \leq 0.07 \text{ mm}.$$

7. The shiftable image sensor module of claim 6, wherein the width of each of the conductive wire units is Wc, and the following condition is satisfied:

$$Wc \leq 0.05 \text{ mm}.$$

8. The shiftable image sensor module of claim 1, wherein at least four of the conductive wire units are adjacently disposed, a spacing distance between adjacent two of the at least four conductive wire units is Dc, a width of each of the conductive wire units is Wc, and the following condition is satisfied:

$$2 \leq Dc/Wc \leq 7.$$

9. The shiftable image sensor module of claim 1, wherein a number of the conductive wire units is N, and the following condition is satisfied:

$$20 \leq N.$$

10. The shiftable image sensor module of claim 1, wherein a cross-sectional width of the elastic connecting portion is We, a cross-sectional height of the elastic connecting portion is He, and the following condition is satisfied:

$$0.01 \leq We/He \leq 0.9.$$

11. The shiftable image sensor module of claim 10, wherein the cross-sectional width of the elastic connecting portion is We, the cross-sectional height of the elastic connecting portion is He, and the following condition is satisfied:

$$0.05 \leq We/He \leq 0.6.$$

12. The shiftable image sensor module of claim 1, wherein each of the conductive wire units is disposed on a same plane.

13. The shiftable image sensor module of claim 1, wherein all of surfaces of a periphery of each of the conductive wire units are directly contacted with air.

14. The shiftable image sensor module of claim 1, wherein the conductive wire portion comprises a copper metal material.

15. The shiftable image sensor module of claim 1, wherein the conductive wire portion comprises a copper alloy material.

16. The shiftable image sensor module of claim 15, wherein a proportion of copper content of the copper alloy material is MCu, and the following condition is satisfied:

$$98\% < MCu < 100\%.$$

17. A camera module, comprising:
   the shiftable image sensor module of claim 1;
   an imaging lens assembly module configured to image an imaging light on the image sensor of the shiftable image sensor module; and an optical image stabilizing driver configured to provide a driving force of the image sensor moving relatively to the imaging lens assembly module.

18. An electronic device, comprising:
the camera module of claim 17.

19. A shiftable circuit element, comprising:
an inner frame portion having a plurality of electrical connecting terminals;
an outer frame portion disposed around the inner frame portion, and the outer frame portion having a plurality of electrical connecting terminals;
an elastic connecting portion physically connected to the outer frame portion and the inner frame portion, and the elastic connecting portion is configured to support the inner frame portion, so that the inner frame portion moving relatively to the outer frame portion; and
a conductive wire portion composed of a plurality of conductive wire units;
wherein each of the conductive wire units has two ends, the two ends of each of the conductive wire units are electrically connected to each of the electrical connecting terminals of the outer frame portion and each of the electrical connecting terminals of the inner frame portion, respectively, the conductive wire units of the conductive wire portion are not physically contacted, and an entire of each of the conductive wire units is a conductor material.

20. The shiftable circuit element of claim 19, wherein each of the conductive wire units is disposed on a same plane.

21. The shiftable circuit element of claim 19, wherein all of surfaces of a periphery of each of the conductive wire units are directly contacted with air.

22. The shiftable circuit element of claim 19, wherein at least four of the conductive wire units are adjacently disposed, a spacing distance between adjacent two of the at least four conductive wire units is Dc, and the following condition is satisfied:

$0.05\ mm \leq Dc \leq 0.35\ mm.$

23. The shiftable circuit element of claim 22, wherein the spacing distance between the adjacent two of the at least four conductive wire units is Dc, and the following condition is satisfied:

$0.10\ mm \leq Dc \leq 0.30\ mm.$

24. The shiftable circuit element of claim 19, wherein a width of each of the conductive wire units is Wc, and the following condition is satisfied:

$Wc \leq 0.07\ mm.$

25. The shiftable circuit element of claim 24, wherein the width of each of the conductive wire units is Wc, and the following condition is satisfied:

$Wc \leq 0.05\ mm.$

26. The shiftable circuit element of claim 19, wherein at least four of the conductive wire units are adjacently disposed, a spacing distance between adjacent two of the at least four conductive wire units is Dc, a width of each of the conductive wire units is Wc, and the following condition is satisfied:

$2 \leq Dc/Wc \leq 7.$

27. The shiftable circuit element of claim 19, wherein a number of the conductive wire units is N, and the following condition is satisfied:

$20 \leq N.$

28. The shiftable circuit element of claim 19, wherein a cross-sectional width of the elastic connecting portion is We, a cross-sectional height of the elastic connecting portion is He, and the following condition is satisfied:

$0.01 \leq We/He \leq 0.9.$

29. The shiftable circuit element of claim 28, wherein the cross-sectional width of the elastic connecting portion is We, the cross-sectional height of the elastic connecting portion is He, and the following condition is satisfied:

$0.05 \leq We/He \leq 0.6.$

30. The shiftable circuit element of claim 19, wherein the conductive wire portion comprises a copper metal material.

31. The shiftable circuit element of claim 19, wherein the conductive wire portion comprises a copper alloy material.

32. The shiftable circuit element of claim 31, wherein a proportion of copper content of the copper alloy material is MCu, and the following condition is satisfied:

$98\% < MCu < 100\%.$

* * * * *